UNITED STATES PATENT OFFICE.

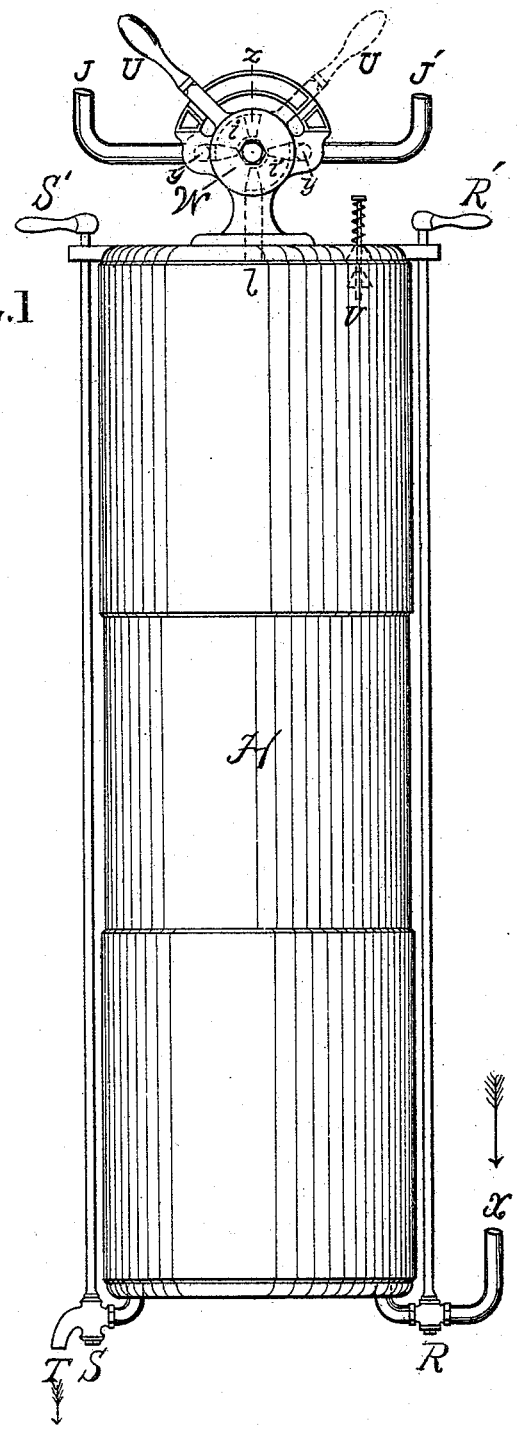

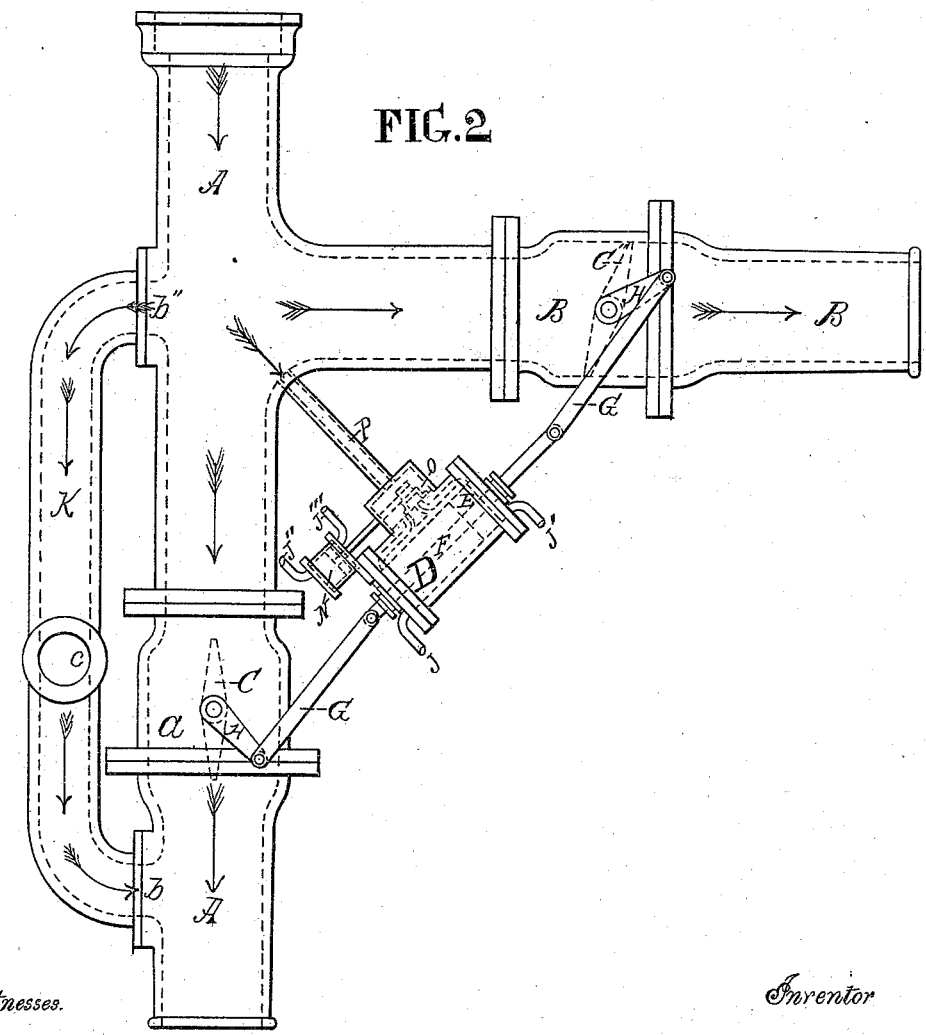

HENRY P. M. BIRKINBINE, OF PHILADELPHIA, PENNSYLVANIA.

IMPROVEMENT IN APPARATUS FOR COMPRESSING AIR FOR OPERATING VALVES.

Specification forming part of Letters Patent No. 171,977, dated January 11, 1876; application filed November 8, 1875.

*To all whom it may concern:*

Be it known that I, HENRY P. M. BIRKINBINE, of the city and county of Philadelphia, in the State of Pennsylvania, have invented a new and useful Apparatus for Compressing Air for Operating Valves in Hydraulic Mains, which improvement is fully set forth in the following specification, reference being had to the accompanying drawings.

The object of the invention is to furnish compressed air for operating the valves of hydraulic mains in my fire-protection, for which Letters Patent were granted to me December 31, 1872, No. 134,348; and the invention consists of a compressing-chamber having an induction and an eduction pipe communicating with one end of the vessel and controlled by suitable valves, and a four-way valve having pipes communicating, respectively, with the pipes which lead from the opposite ends of the operating-cylinder in my said fire-protection, as hereinafter described.

In the accompanying drawings, Figure 1 is a side elevation of my apparatus; Fig. 2, Sheet No. 2, is a top view of my valves for hydraulic mains.

In Sheet No. 1, H represents the compressing-chamber, and is a vessel of any convenient shape, made perfectly air-tight, with the induction water-pipe X leading to the bottom of the vessel, controlled by the valve R and operated by the lever R'. The drain or eduction pipe T is controlled by the valve S and operated by the lever S'. This is also fitted to the bottom of the vessel. The top of the vessel is fitted with a four-way valve, W, so arranged that communication can be opened between one of the pipes leading to the operating-cylinder for controlling the hydraulic valves, and the other pipe open to the air, thus allowing it to escape from the opposite end of the operating-cylinder through the pipe J, and by changing the lever U to the position indicated by dotted lines the connection between the pipes will be reversed. The valve W is fitted to the case W', which is fastened to the top of the chamber H, and has an aperture, *l*, leading into the chamber. The valve or disk W works on the center-pin *m*, and is operated by means of the lever U. In this disk are passage-ways *i* and *i'*, which connect the passage *l* from the chamber H to the opening *y'* and pipe J'. Another passage, *i*, in the movable disk, connects the opening *y*, leading to the pipe J, with the open air, by means of the aperture Z, which leads through a corresponding opening in the case W. By moving the lever U from the position shown by full lines to that shown by dotted lines, the connection with the compressing-chamber, pipes, and open air will be reversed. The compressing-chamber H, Sheet No. 1, is also fitted with an air-valve, *v*, opening into the chamber, but kept closed by a spring.

Sheet No. 2 represents valves for hydraulic mains, arranged as in my fire-protection, patented December 31, 1872, No. 134,348, in which A is the pumping-main, and B a distributing-main. C is a valve inserted in the pumping-main at the point *a*, and C' another valve, connected with the distributing-main at the point *a'*. D is a cylinder, which is provided with a piston, E. F is the piston-rod, at each end of which is jointed a connecting-rod, G, the outer ends of which connect with the crank-arms H H of the valves C and C'. J J' are pipes which connect with the end of the cylinder D, and lead to the pumping-station, police-station, or any other point from which it is desired to operate the valves. The valves are opened and closed by forcing water or other fluid through the pipe J when it is desired to close the valve C and open the valve C', so as to cut off the flow of water into the reservoir or other receptacle, and to use the force of the pumping apparatus to force the water through the distributing-main; and when the position of the valves is to be reversed, so as to open the flow of water to the reservoir through the pipe A, and cut off the flow of water through the distributing-pipe B, the valves in this case are to be opened and closed by the pressure of air produced in the compressing-chamber, conveyed through the pipes J and J' into the cylinder D or by water. When the pneumatic pressure is only used to move the valve for the admission or escape of the water by means of the cylinder N and the pipes J'' J''', which are connected with the compressing-chamber, the water moving the piston of the larger cylinder is taken from the main by means of the pipe P.

The operation of the apparatus is as follows: The valve W, Sheet No. 1, on the compressing-chamber H is so arranged that communication is open between the compressing-chamber through the pipe J' to the operating-cylinder D, Sheet No. 2, and communication from the opposite end of the cylinder to the open air through the pipe J and aperture Z, Sheet No. 1. The stop S being closed, the stop R on the water-pipe X is opened and the water admitted to the chamber H. This will compress and force the air contained in the chamber through the pipe J', and drive the piston to the opposite end of the cylinder. Closing the valve C and opening the valve C', the air will be expelled from the chamber H, Sheet No. 1, with a pressure due to the head of water above the compressing-chamber. When the change has been made in the hydraulic valves, they may be reversed by emptying the chamber and allowing it to fill with air by means of the valve V; then, by changing the position of the lever U from the position shown by full lines to that shown by dotted lines, and closing the drain S and opening the cock R, the water will force the air along the pipe J and move the valve in the opposite direction, thus reversing the valves in the hydraulic mains. By this means the water may be turned from flowing into the reservoir and directed into the distributing-mains, and the power of the pumping machinery brought directly to bear upon the distributing-mains, and, in case of fire, produce any desired pressure; and when the fire is out and the necessity for retaining a great pressure is removed, the valves may be again changed. This may be done from a point distant from the valves, say the engine-house or police-station, it being simply necessary to connect the compressing-chamber with the operating-cylinder by means of suitable pipes. The pressure of the air may also be used to operate the valves of a larger cylinder, in which the pressure of the water in the mains is made to act directly upon the piston-head in the operating-cylinder D, as shown in Sheet No. 2, where N represents the air-cylinder, which is made to move the valve O of the larger cylinder D, which operates the hydraulic valves in the mains. The water to produce the change is taken from the water-pipes by means of the pipe P. The parts J'' J''' N O P are not shown in the drawings in my Patent No. 134,348.

I do not claim the compressing-chamber or valves, nor do I confine myself to any form of valve; but What I do claim is—

The compressing-chamber H, in combination with the valve W and the pipes J and J', for producing the pressure to operate the valves in hydraulic mains, substantially as set forth.

HENRY P. M. BIRKINBINE.

Witnesses:
  THOMAS J. BEWLEY,
  STEPHEN USTICK.